United States Patent
Maschino et al.

(10) Patent No.: US 7,364,687 B2
(45) Date of Patent: Apr. 29, 2008

(54) SOFT FILM

(75) Inventors: Andrew D. Maschino, Terre Haute, IN (US); Marcelo S. Copat, Terre Haute, IN (US)

(73) Assignee: Tredegar Film Products Corp, Richmond, VA (US)

(*) Notice: Subject to any disclaimer, the term of this patent is extended or adjusted under 35 U.S.C. 154(b) by 503 days.

(21) Appl. No.: 10/788,034

(22) Filed: Feb. 27, 2004

(65) Prior Publication Data

US 2004/0227275 A1 Nov. 18, 2004

Related U.S. Application Data

(60) Provisional application No. 60/449,845, filed on Feb. 27, 2003.

(51) Int. Cl.
*B05B 1/04* (2006.01)
(52) U.S. Cl. .............. 264/500; 137/561 A; 425/290; 239/594
(58) Field of Classification Search ............. 425/290, 425/182, 137; 264/500; 137/561 A; 239/594, 239/592, 590
See application file for complete search history.

(56) References Cited

U.S. PATENT DOCUMENTS

| | | | |
|---|---|---|---|
| 3,054,148 A | 9/1962 | Zimmerli | |
| 3,929,135 A | 12/1975 | Thompson | |
| 4,052,002 A * | 10/1977 | Stouffer et al. | ........ 239/4 |
| 4,155,693 A | 5/1979 | Raley | |
| 4,252,516 A | 2/1981 | Raley et al. | |
| 4,324,246 A | 4/1982 | Mullane et al. | |
| 4,327,730 A | 5/1982 | Sorensen | |
| 4,342,314 A | 8/1982 | Radel et al. | |
| 4,508,256 A | 4/1985 | Radel et al. | |
| 4,509,908 A | 4/1985 | Mullane, Jr. | |
| 4,535,020 A | 8/1985 | Thomas et al. | |
| 4,552,709 A | 11/1985 | Koger et al. | |
| 4,572,165 A | 2/1986 | Dodier | |
| 4,609,518 A | 9/1986 | Curro et al. | |
| 4,629,643 A | 12/1986 | Curro et al. | |
| 4,695,422 A | 9/1987 | Curro et al. | |
| 4,778,644 A | 10/1988 | Curro et al. | |
| 4,839,216 A | 6/1989 | Curro et al. | |
| 5,474,102 A * | 12/1995 | Lopez | ........ 137/271 |
| 5,562,932 A | 10/1996 | Rieker | |
| 5,591,510 A | 1/1997 | Junker et al. | |
| 5,718,928 A | 2/1998 | Rieker | |
| 5,770,144 A | 6/1998 | James et al. | |
| 6,022,607 A | 2/2000 | James et al. | |
| 6,240,817 B1 | 6/2001 | James et al. | |

FOREIGN PATENT DOCUMENTS

| | | |
|---|---|---|
| DE | 206871 C | 2/1909 |
| GB | 1031040 A | 5/1966 |

* cited by examiner

*Primary Examiner*—Robert B. Davis
*Assistant Examiner*—Marissa W Chaet
(74) *Attorney, Agent, or Firm*—Troutman Sanders LLP

(57) ABSTRACT

The invention relates to a method of making a film, and to a die for making the film. The fluid die includes a fluid feed manifold connected to a housing having positioned therein at least one fluid feed channel in fluid communication with the fluid feed manifold. The housing also includes at least one profiling block within the fluid feed channel.

32 Claims, 13 Drawing Sheets

PRIOR ART

PRIOR ART

PRIOR ART

FIGURE 8
A 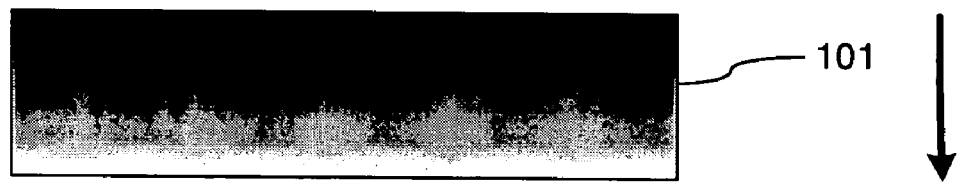
B 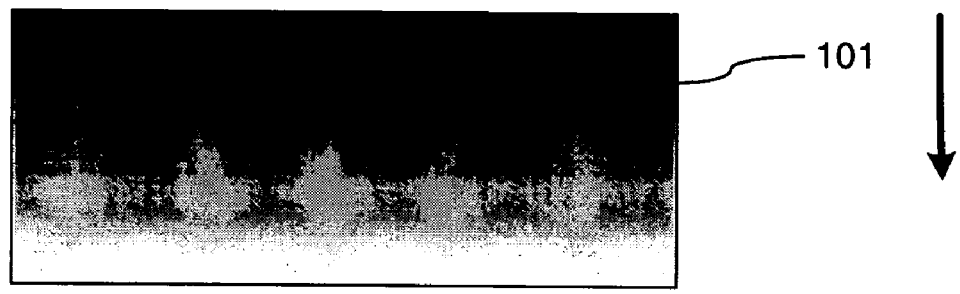

SOFT FILM

FIELD OF THE INVENTION

Embodiments of the present invention relate to an improved personal care coverstock such as a topsheet for use in body contacting articles such as baby diapers, adult incontinent absorbent articles, sanitary napkins or panty liners, facial wipes, body wipes, and the like. Embodiments of the invention are directed to the improved coverstocks, the method of making improved soft films, and the apparatus used in the method.

BACKGROUND OF THE INVENTION

It is known to vacuum-form two-dimensional sheets to create three-dimensional formed films, by causing a softened or molten polymer sheet to conform to the shape of a forming screen. Commonly utilized apertured formed film topsheets are disclosed in, for example U.S. Pat. Nos. 3,929,135, 4,324,246, 4,342,314, 4,252,516, 4,535,020, 5,591,510, and U.S. patent application Ser. No. 10/082,040 filed Feb. 20, 2002. The formed films described in these publications are formed by application of a fluid pressure differential where the fluid preferably is air to thereby cause the polymer sheet to conform to the screen and also to cool. A preferred feature of these formed films is that the polymer crystallizes, or "sets" after the molten polymer has been formed. The resultant formed film therefore is said to have "memory." Memory enables the formed film to regain its original form after non-deforming forces are applied to it, for example while the film is stored in the form of a wound roll. A disadvantage of vacuum formed films is that the body contacting surface of the film my have a plastic feeling that can feel both sticky and hot to the wearer of the article.

It also is known to utilize high pressure water jet systems, known as hydroforming systems, to cause two-dimensional polymeric films to conform to forming screens in order to create three-dimensional films. U.S. Pat. Nos. 4,609,518, 4,629,643, 4,695,422, 4,778,644, and 4,839,216, all to Curro (referred to herein as "Curro") and assigned to Procter & Gamble, and U.S. Pat. Nos. 5,770,144, 6,022,607, and 6,240,817 assigned to McNeil, describe a multitude of film designs created by the combination of forming screens using high pressure water jet systems. In these systems, pressurized water is ejected from nozzles projecting water onto the surface of a polymeric film causing it to conform to the surface of an underlying support screen. The screen has indentations or perforations disposed on its surface. As the screen rotates it causes subsequent portions of the film to pass under the water jet causing subsequent portions of the film to conform to the screen. An advantage of this method of making formed films is that the number of protrusions that can be made in a specific surface area of film is greater than what is possible in a vacuum formed film process. Another advantage is that by utilizing water to deform crystalline film high levels of energy are applied to the film thereby causing more work and making the film softer. A disadvantage of known hydroformed films is that liquid jets apply forming energy unevenly across the film surface causing variation in the important film properties that limits the functionality of the film.

The description herein of certain advantages and disadvantages of known materials, and methods of their preparation, is not intended to limit the scope of the present invention. Indeed, the present invention may include some or all of the methods and materials described above without suffering from the same disadvantages.

SUMMARY OF THE INVENTION

It is a feature of an embodiment of the invention to improve the functional performance of hydroformed films by providing a film with improved properties. It is another feature of an embodiment of the invention to provide a cost effective method of making improved hydroformed soft film. It is an additional feature of an embodiment of the invention to provide an apparatus that improves hydroforming efficiency and quality, and lowers equipment and film production cost.

Embodiments of the inventions described herein are directed to improved hydroforming methods and to an apparatus for forming films. A preferred embodiment comprises use of a liquid die to apply forming energy to a film while the film is positioned over a screen with indentations.

Additional embodiments of the inventions described herein also are directed to improved films resulting from the application of the methods described herein, whereby the films exhibit less variation in their properties and are less costly to produce than films made with liquid jets using the same screens.

BRIEF DESCRIPTION OF THE DRAWINGS

FIG. 8 illustrates two liquid die pattern footprints of the invention.

DETAILED DESCRIPTION

Figure 1:
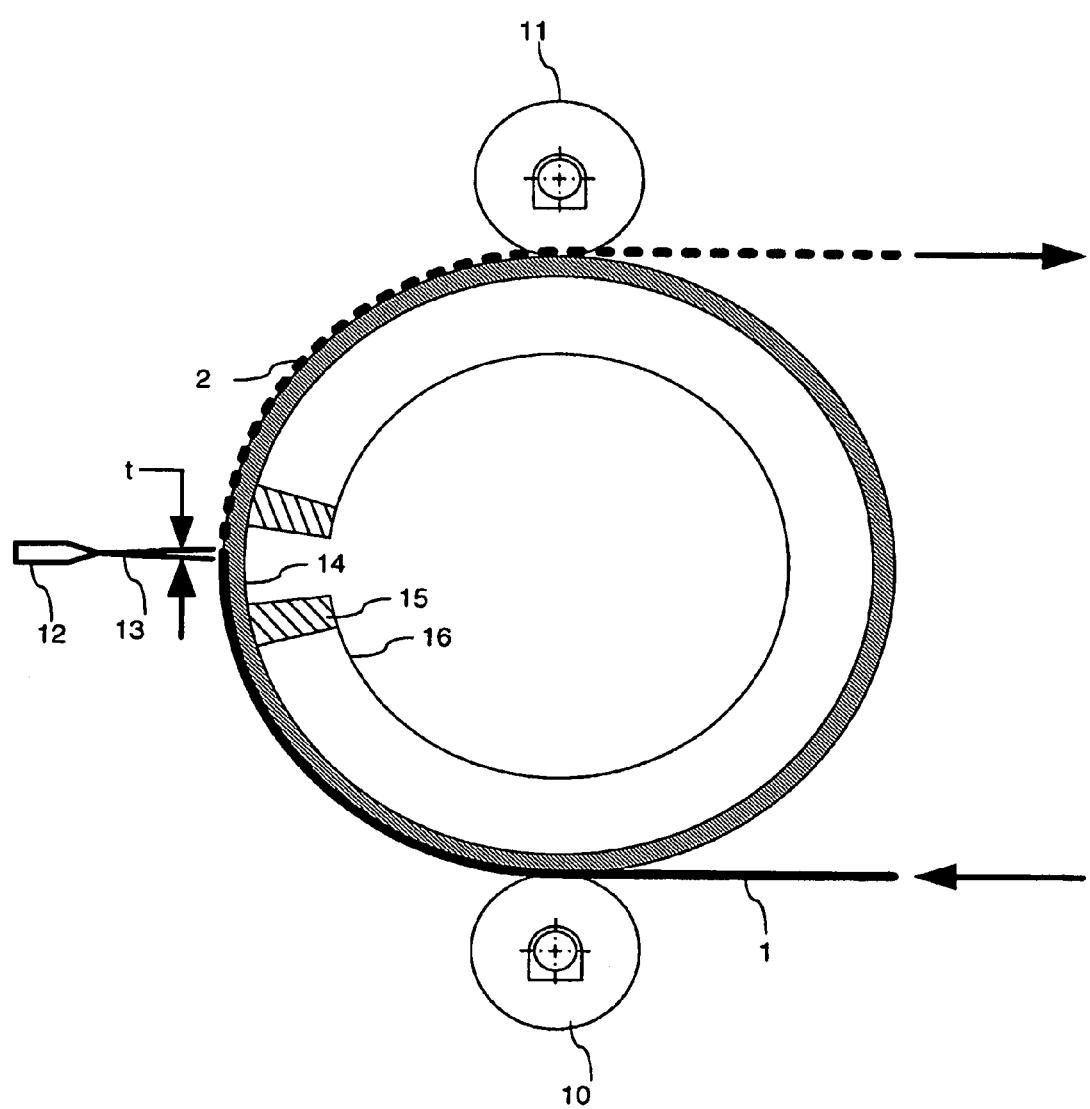
FIG. 1 illustrates a side view of a known liquid jet hydroforming system.

Set forth below are definitions of some of the terms and expressions used herein.

The term "substantially" means that a given property or parameter (such as the surface angle) may vary by about 30% from the stated value. As used herein and in the appended claims, the singular forms "a," "an," and "the" include plural reference unless the context clearly dictates otherwise. Thus, for example, a reference to "a protuberance" includes a plurality of such protuberances, and a reference to "an aperture" is a reference to one or more apertures and equivalents thereof known to those skilled in the art, and so forth.

As used herein, the phrase "areas immediately surrounding the region of maximum fluid discharge" means a surface area surrounding the region of maximum fluid (i.e. liquid) and/or solid waste discharge and extending approximately 1 inch in all directions from that region. The term "periphery" "peripheral areas" or "areas peripheral to" means the surface area other than the area of maximum fluid discharge and the areas immediately surrounding it.

The term "multiplicity" as used in conjunction with various parameters and properties of the protuberances such as elevation angle, surface angle, and permeability, means that individual protuberances have a particular value for each parameter or property (rather than multiple values of each parameter in a single capillary), but different protuberances with different respective parameters or properties can be placed in a given area. Of course, as discussed herein, multiple protuberances having substantially the same value of a given parameter or property may be grouped together in a given area (or region).

The expression "regulated pattern" means regions of protuberances in the film (and therefore in the component(s) of the absorbent article that include the film) where a selected property or selected properties of the protuberances are repeatably controlled, i.e., the property or properties is or are controlled to achieve a desired pattern of the selected property or properties. If a region comprises a regulated pattern of protuberances, it does not necessarily mean that all protuberances in that region have exactly the same property (or properties) that was selected to be controlled. It means that the selected property is varied in a designed, prescribed manner (or pattern) to substantially achieve a particular formula. Each region has only one regulated pattern. For example, two regions where the protuberances in both regions have the same properties, except elevation angle, are two regions (or zones) each having a unique regulated pattern that is different from the regulated pattern in the other zone. The properties that can be selected to be controlled include: elevation angle, surface angle, vapor permeability, liquid permeability, compression resistance, surface areas of one or both openings of the protuberances, length of the protuberances, texture of the walls of the sidewall of the protuberances and shape of protuberances.

The term "permeability" refers to the permeability of a fluid (e.g., a vapor or a liquid).

The term "coverstock" refers to at least one of the outer webs of an article. In the case of an absorbent article, "coverstock" typically will denote the body contacting outer web. Coverstock webs can be film webs, nonwovens webs, laminate webs and apertured laminate webs.

The term "web" refers to a material capable of being wound into a roll. Webs can be film webs, nonwoven webs, laminate webs, apertured laminate webs etc.

The term "sheet" typically refers to a curtain of extruded molten polymer that has not solidified into a film.

The term "film" refers to a web made by extruding molten polymeric material and then cooling the material to form a solid polymeric web. Films can be monolayer films, coextruded films, coated films, and composite films. Coated films are films comprising a monolayer or coextruded film that are subsequently coated (extrusion coated, impression coated, printed) with a thin layer of the same or different material to which it is bonded. Composite films are films comprising more than one film where the at least two films are bonded in a bonding process. Bonding processes may incorporate adhesive layers between the film layers.

The term "panel" means a square or rectangularly shaped sheet of steel or similar material. The term "plate" means a bonded stack of panels. The term "perforation" as used herein refers to an aperture in the screen. he term "indentation" as used herein refers to a recess located at least on the outermost surface of a screen. Indentations may connect the outermost surface and the innermost surface of the screen to create perforations in the screen. In other words, perforations are indentations but indentations are not necessarily perforations.

The expression "minimum width" as used herein to describe apertures, perforations, or indentations, means the minimum distance possible between any two edges measured on the plane of the aperture (or perforation or indentation). The minimum width of a circle is its diameter. The minimum width of an ellipse is the length of its minor axis. The minimum width of a slot is the distance between its parallel straight edges. A "slot" denotes an elongated ellipse having a major and minor axis. Accordingly, the minimum width of a slot also is the length of its minor axis.

The term "screen" as used herein refers to a three-dimensional molding apparatus comprising indentations used to form protuberances in films. In a particularly preferred embodiment screens comprise tubular members, having a width and a diameter. In alternative embodiments screens comprise belts having a width and a length. The transverse direction is the direction parallel to the width of the screen. The machine direction is the direction parallel to the direction of rotation of the screen, and is perpendicular to the transverse direction.

The term "protuberance" can be defined with reference to a three-dimensional member comprising an apertured base portion located in the plane of the first surface of the film and a sidewall portion extending generally in the direction of the second surface of the film. Each base portion has a sidewall portion. Sidewall portions terminate in "ends" located in the plane of the second surface of the film. A protuberance extends from the first surface to the second surface, and is comprised of the aperture in the base portion in the first surface, the sidewalls, and the end in the second surface. The ends of the protuberances may be apertured or unapertured. An apertured protuberance also is referred to herein as an aperture.

The apertures in the base portions of the protuberances, also called "primary apertures", are preferably in the shape of polygons, e.g., squares, hexagons, pentagons, ellipses, circles, ovals, slots, etc., in a regulated or random pattern. The protubered ends if apertured are called "secondary apertures", and are preferably in the shape of polygons, e.g., squares, hexagons, pentagons, ellipses, circles, ovals, slots, etc. Protuberances in the film preferably correspond to indentations in the screen, and apertured protuberances in the film correspond to perforations in the screen.

The prefix "macro" as used herein refers to structural features or elements that are readily visible to a normal human eye when the perpendicular distance between the viewer's eye and the plane of the web is about 30 centimeters (cm.). Conversely, the prefix "micro" is utilized to refer to structural features or elements that are not readily visible to a normal human eye when the perpendicular distance between the viewer's eye and the plane of the web is about 30 cm.

In general, the coverstock of certain embodiments of the invention should have soft feel, and good liquid acquisition and rewet prevention to maintain a dry surface and thereby keep the skin of the wearer dry. The absorbent core typically should provide enough absorbent capacity and allow the flow of vapor and/or air through the coverstock. The backsheet should prevent liquid passage while being sufficiently breathable. Furthermore, the individual elements of the absorbent article (i.e. the topsheet, the optional distribution layer, the absorbent core and the backsheet) can be joined together to form an absorbent garment, using any techniques known in the art so that the final article has the desired comfort and performance level. Suitable absorbent garments are described in, for example, U.S. Pat. Nos. 4,798,603, 5,176,668, 5,176,672, 5,192,606, and 5,509,915, the disclosures of each of which are herein incorporated by reference in their entirety. Those skilled in the art are capable of using the coverstocks described herein in any suitable absorbent article.

Radel, U.S. Pat. No. 4,508,256, the disclosure of which is incorporated by reference herein in its entirety, discloses a method of making a forming screen (the "PEL" method) by etching flat metal panels and stacking those panels in a manner such that the openings in the panels align to form passageways in the stack. The center axis of the passageways is positioned at a 90° angle from a plane parallel to the surface of the stack. In other words, the passageways are aligned perpendicularly to the surface of the stack. The stacked panels then are bonded to form a plate, and subsequently the plates are rolled and welded to form a cylindrical tube or screen. The passageways in the resulting screens are also aligned perpendicularly to the surface of the screens. Screens produced by this method are referred to as PEL screens. U.S. Pat. Nos. 5,562,932 and 5,718,928, the disclosures of which are incorporated by reference herein in their entireties, disclose an improved method for producing PEL screens capable of forming angled or curved protuberances.

U.S. Pat. No. 4,252,516, the entire disclosure of which is incorporated herein by reference, describes a screen comprising a series of generally hexagonal-shaped depressions attached at their edges having elliptical-shaped holes centered therein and sloping sidewalls. The holes at the inner surface of the screen are elliptical in shape and oriented so that the major axis is aligned in the machine direction. The minor axis of the ellipse is oriented in a direction perpendicular to the major axis. The preferred elliptical hole has a major axis length of from about 24 mils to about 26 mils and a minor axis length of from about 17 mils to about 19 mils; most preferably, the major axis has a length of 25 mils and minor axis has a length of 18 mils. The ratio of the preferred major axis to the minor axis length is 1.4.

One of the earlier methods for vacuum perforation of a polymeric film is disclosed in Zimmerli, U.S. Pat. No. 3,054,148, the entire disclosure of which incorporated herein by reference. Zimmerli describes a stationary drum having a screen mounted around the outer surface of the drum and adapted to freely rotate thereon. A plasticized thermoplastic material is applied onto the screen. A vacuum chamber is employed beneath the screen to create a pressure differential between the respective surfaces of the thermoplastic sheet to be perforated to cause the plasticized sheet material to flow into openings provided in the screen and thereby cause a series of openings, holes or perforations to be formed in the plastic sheet. Zimmerli discloses a method for making a film with tapered protuberances. A variety of methods and apparatus including different types of perforating screens have been developed over the years since Zimmerli's invention for making apertured films. Examples of such methods and apparatus are described in U.S. Pat. Nos. 4,155,693, 4,252,516, 4,508,256, and 4,509,908, the entire disclosures of each of which are incorporated herein by reference.

FIG. 1 illustrates a liquid jet hydroforming process similar to that described in detail in Curro, U.S. Pat. No. 4,629,643, the entire disclosure of which is incorporated by reference herein. In the Curro liquid jet hydroforming process, a film 1 of a polymeric material is fed either from a supply roll or from a cast-extrusion station or die onto the surface of a screen 14 that rotates about a stationary vacuum chamber 16. A high pressure jet 13 of liquid, preferably at least about 800 psig, is directed by a liquid nozzle 12 at the exposed surface of a substantially smooth, flat film intermediate a pair of baffles 15 as the web traverses the vacuum chamber. The jet of liquid 13 typically has a spray radius, a cross-section of which is indicated by the letter "t" in FIG. 1. The jet of liquid causes the smooth flat film to assume the general contour of the pattern of the woven wire screen (e.g., a knuckle pattern, or the like) to create a formed film 2. In addition, because the interstices formed by the intersecting filaments are unsupported, the fluid jet causes rupture at those portions of the film coinciding with the interstices in the forming structure. The film 1 can be brought into contact with the surface of screen 14 by roller 10, and the formed film removed from screen 14 by roller 11. The hydroforming method results in the formation of micro-apertures having volcano-shaped sidewalls with relatively thin, irregularly shaped petals about their periphery. The outermost extremities of the petals are substantially thinner due to the elongation that occurs just prior to rupture of the film by the high pressure liquid jet.

Figure 2:
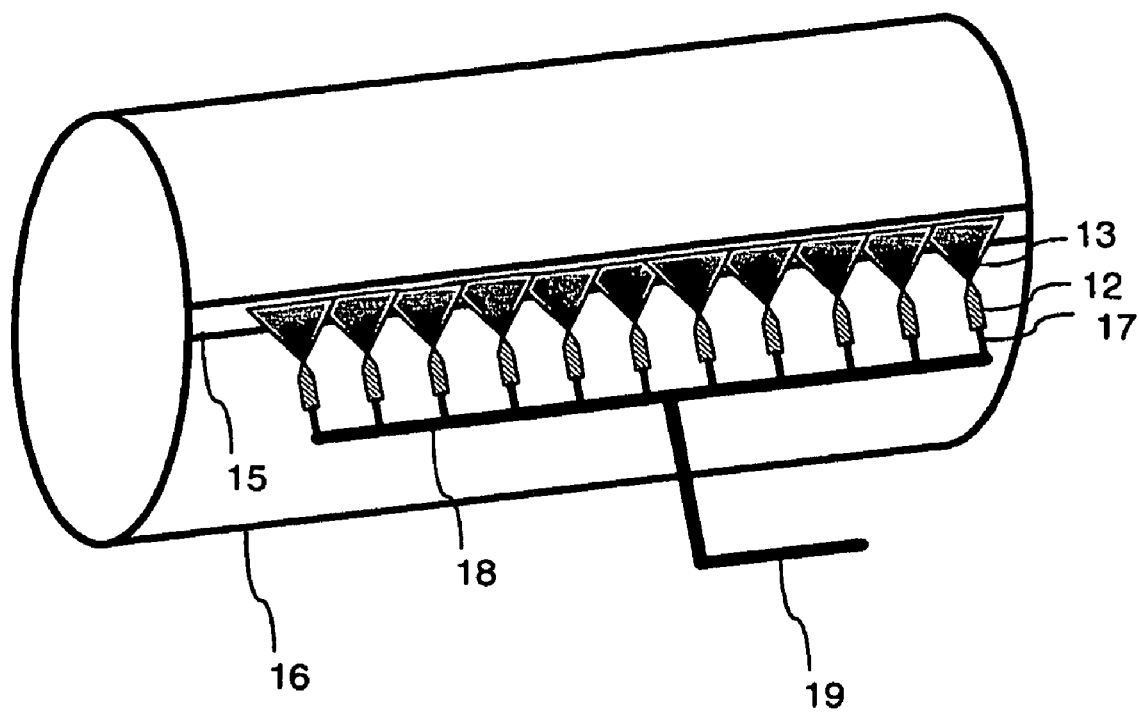
FIG. 2 is a perspective view of a known liquid jet hydroforming system shown without a forming screen.
Figure 3:
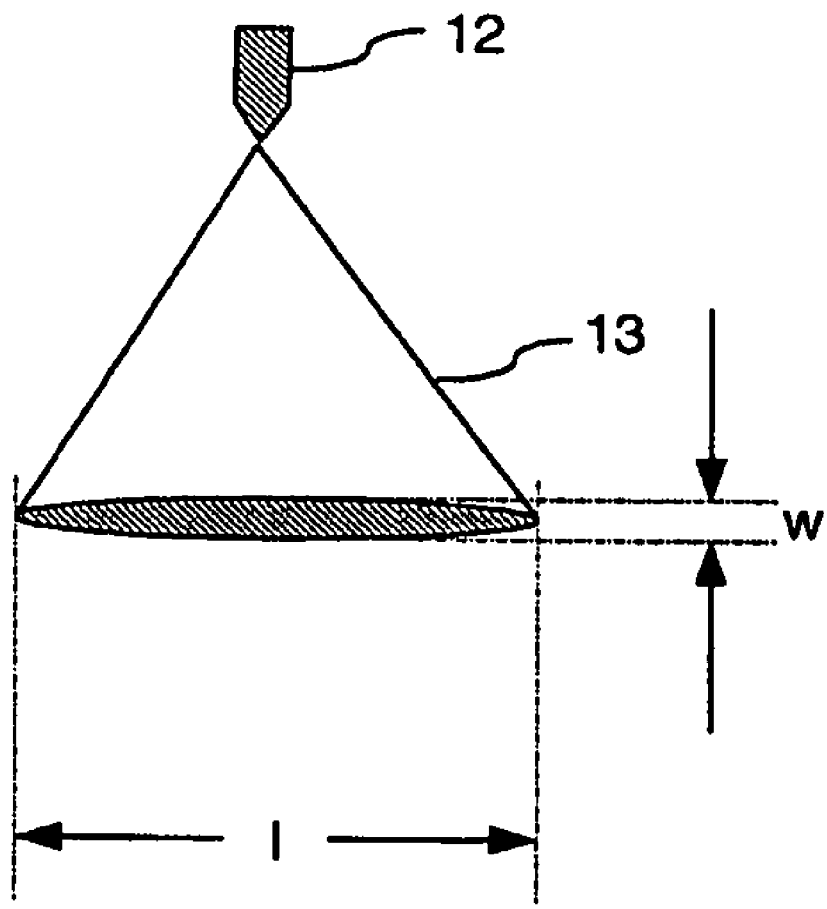
FIG. 3 depicts a liquid jet pattern.

FIG. 2 is a schematic of a hydroforming jet system in greater detail. For clarity the screen is not shown, and like reference numerals denote like embodiments. A plurality of nozzles 12 are shown. Each nozzle typically is fed by a liquid feed channel, in this case a feed pipe 17. Each feed pipe is fed by a manifold 18 that is connected to a liquid delivery pipe 19. FIG. 3 depicts a liquid jet 13 having a pattern footprint and a length. The jewel is the orifice of the nozzle, called "jewel" because it is typically an insert that is fit into a nozzle frame, and the insert is typically made of jewels like sapphire, ruby or diamond in order to provide the nozzle with durability and strength. The footprint of the liquid jet is determined by the shape of the jewel. An elliptical jewel shape creates an elliptical footprint, a circular jewel shape creates a circular footprint, and so on. In FIG. 3, the length "l" of the jet pattern represents the major axis of the ellipse and the width of the pattern "w" represents the minor axis of the ellipse.

Figure 4:
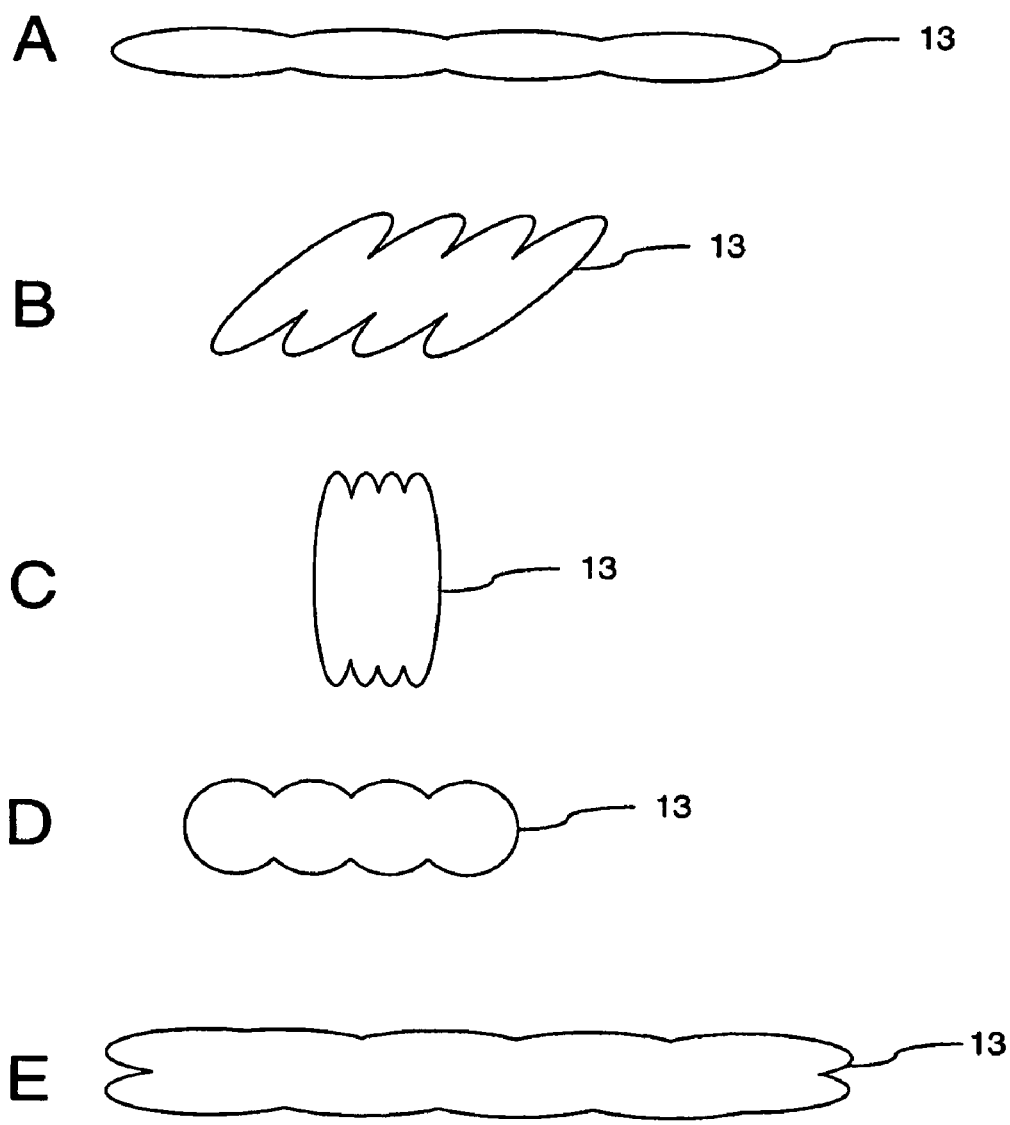
FIG. 4 illustrates various known liquid jet pattern footprints (A-E).

It is known that a typical nozzle delivers liquid jets consisting of liquid droplets. Each droplet has a mass, direction, and a velocity. As the jet pattern length increases, the droplets separate and become distinct from each other. Droplets with a direction substantially parallel to the centerline of the nozzle, or central droplets, have the highest energy delivery potential. The footprint zone impacted by central droplets is referred to as the central forming region. As the direction changes, either away from the centerline in the machine direction, away from the centerline in the transverse direction, or away from the centerline in various degrees in both directions, the energy delivery potential of each droplet decreases. One reason for the loss of energy delivery potential is that as droplets collide with each other some energy is lost in the collision. Particularly in the area where patterns overlap, the droplets of one pattern collide with the droplets of another pattern. Since these non-central, or peripheral, droplets have less kinetic energy anyway, the additional loss can result in a significant loss of film forming capacity that can create variation in the characteristics of the formed film. The footprint zone impacted by peripheral droplets is referred to as the peripheral forming region. When a plurality of nozzles are used the individual liquid jet footprints generated by each nozzle combine to produce a footprint that reflects the type of nozzles selected, and the position of various nozzles relative to each other and to the screen. FIG. 4 illustrates various footprints labeled A-E, which are described in more detail below:

A: A footprint created by 4 elliptical shaped jewels with the major axes of each jewel aligned in a common centerline with the other jewels and in a direction parallel to the transverse direction. The patterns overlap in a manner similar to that shown in FIG. 2.

B: A footprint created by 4 elliptical shaped jewels with the major axes of each jewel aligned at 45° to a direction that is parallel to the transverse direction. The central forming regions are located closer together than the central forming regions in pattern A, therefore the film variation is reduced compared to pattern A.

C: A footprint created by 4 elliptical shaped jewels with the major axes of each jewel aligned in a common centerline with the other jewels and in a direction parallel to the machine direction.

D: A footprint created by 4 circular shaped jewels with the major axes of each jewel aligned in a common centerline with the other jewels and in a direction parallel to the machine direction.

E: A footprint created by eight elliptical shaped jewels, four aligned with their major axes in a common centerline and in a direction parallel to the transverse direction, and the other four aligned with their major axes in a common centerline and in a direction parallel to the transverse direction. The common centerlines are parallel and spaced apart in the machine direction by a distance substantially equivalent to ½ the thickness of the pattern footprint, and offset in the transverse direction by a distance substantially equivalent to ½ the width of the pattern footprint.

Liquid jet systems are "discretely parallel" systems because increasing the width of a system only requires addition of nozzles and the corresponding addition of liquid (i.e., discrete, as compared to continuous, additions). When the nozzle design, number of nozzles, liquid pressure, and liquid temperature is constant, a system can deliver a given amount of forming energy. Rearranging the position of the nozzles does not change the forming energy capacity of the system, it only rearranges how the energy is delivered— wider footprint at lower line speed or narrower footprint at higher line speed (FIG. 4A-C). To increase the system's capacity, more nozzles must be added.

System forming requirements typically are determined by the screen, the material composition of the film, film temperature and line speed. Once the requirements are defined, nozzle selection and quantity combinations can be determined to create a liquid jet system having the appropriate energy delivery capacity. Liquid temperature affects film temperature. As a result, when it is desired to increase the productive capacity of a machine, there is no "economy of scale"—nozzles and liquid must be added in a number and amount proportional to the desired productivity increase.

A limitation of liquid jet systems is that as the number of nozzles increase, liquid management difficulty increases by the corresponding increase in liquid channels, liquid manifolds, and manifold design complexity. When the machine can not accommodate additional nozzles and manifolds the machine forming capacity becomes constrained.

Figure 5:
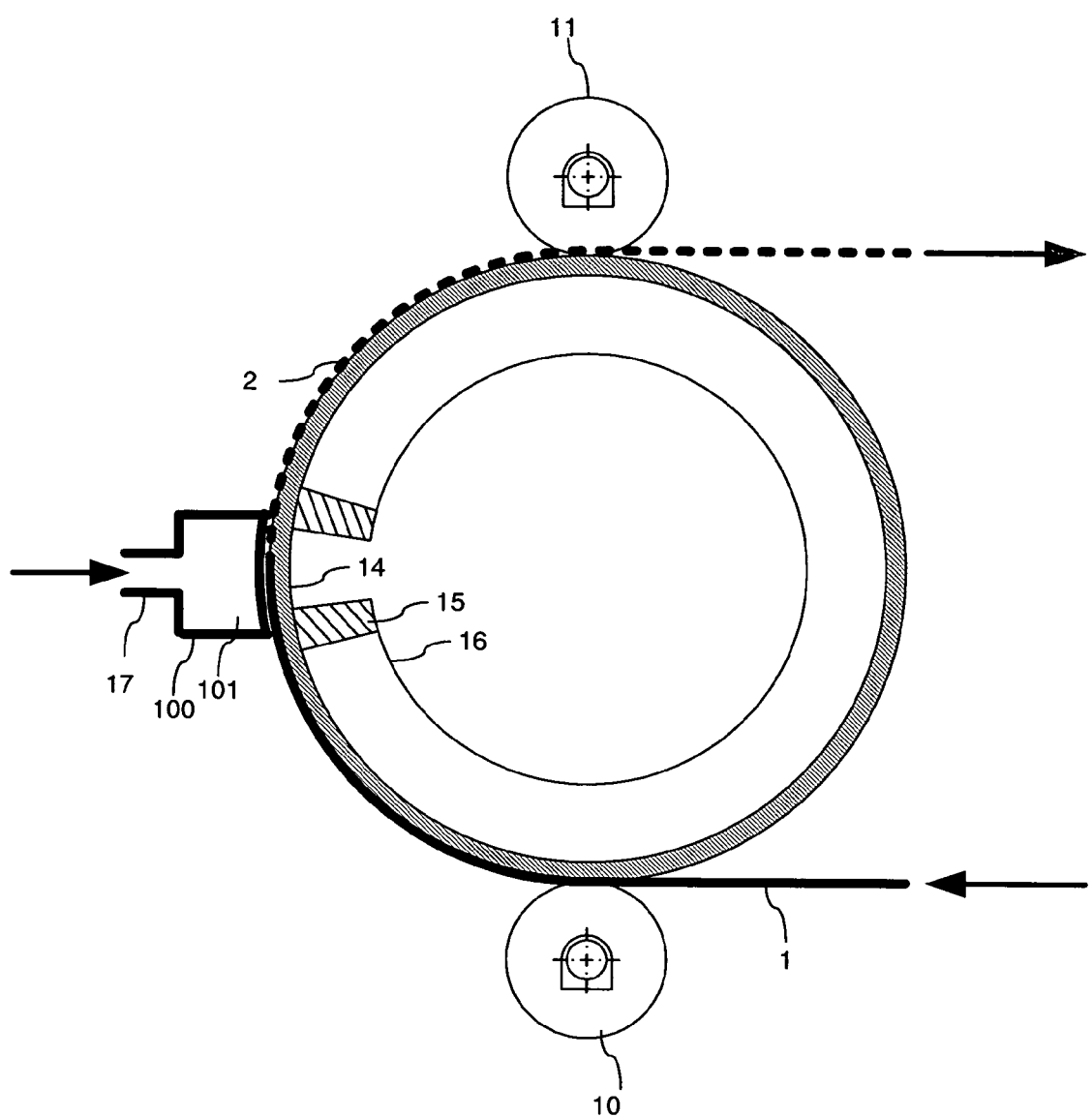
FIG. 5 illustrates a side view of a liquid die hydroforming system of the invention.

FIG. 5 is a schematic of a liquid die 100 and film forming system of a preferred embodiment of the invention. Unlike the liquid jet systems described previously, the liquid die system is not a discrete parallel system: rather, it is a continuous parallel system. Liquid can enter the die cavity 101 at one or a plurality of liquid feed channels 17 served from a common or multiple manifolds (see, FIG. 6B). Liquid exits the die cavity and passes through the film coincident with perforations in the forming screen 14. Alternatively or in combination, liquid may exit the die 100 through channels in the leading and trailing walls of the die. The leading wall is the wall aligned in the transverse direction that is positioned upstream of the trailing wall, and the trailing wall is the wall aligned in the transverse direction that is position downstream of the leading wall.

In FIG. 5, a film 1 of a polymeric material is fed either from a supply roll or from a cast-extrusion station onto the surface of a screen 14 that rotates about a stationary vacuum chamber 16. A continuously supplied mass of liquid, preferably water, is directed by a liquid die 100 at the exposed surface of a substantially smooth, flat film intermediate a pair of baffles 15 as the web traverses the vacuum chamber. The liquid pressure causes the smooth flat film to assume the pattern of indentations and perforations in the screen 14. Subsequently the formed film 2 is removed from the screen, dried and wound.

Figure 6A:
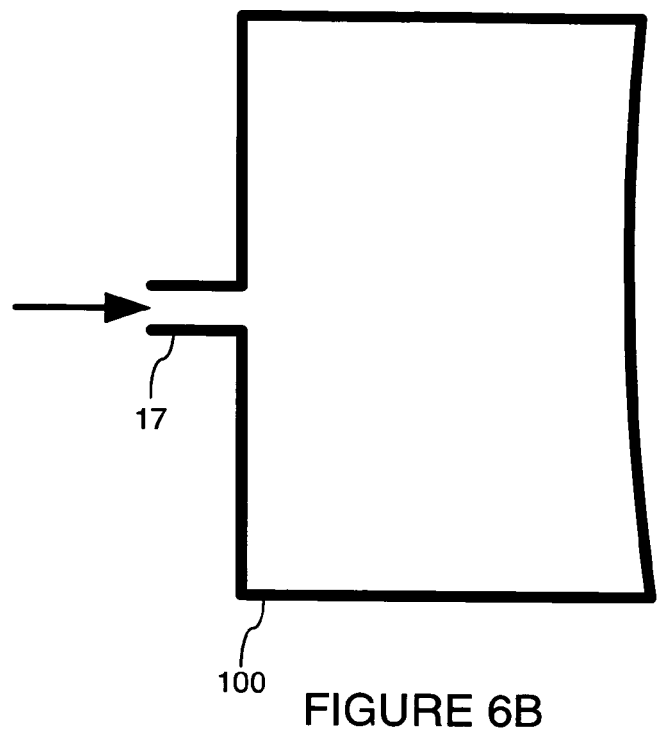
FIG. 6A illustrates a side view of a liquid die of the invention.
Figure 6B:
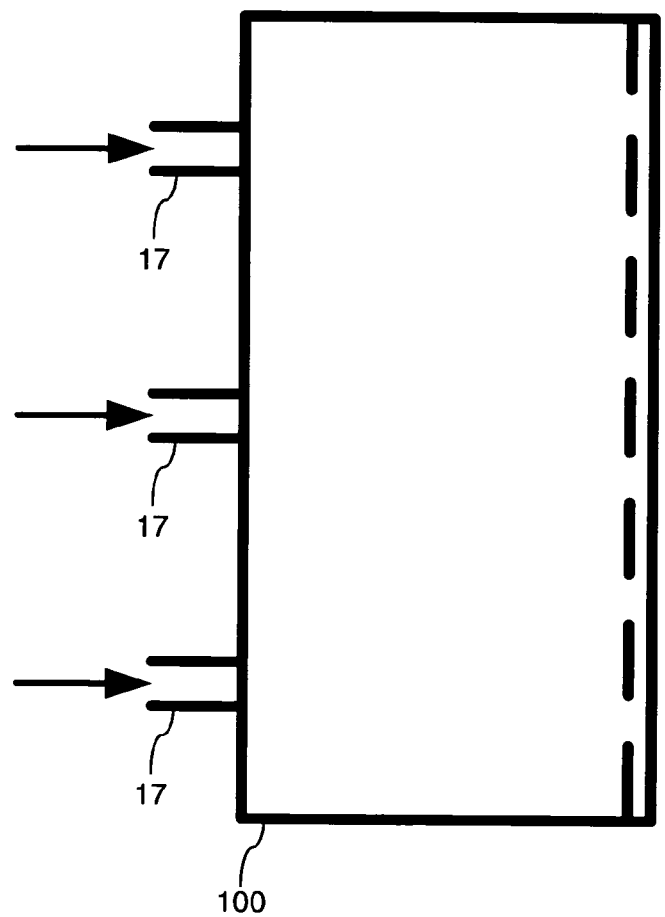
FIG. 6B illustrates a top view of a liquid die of the invention.

FIG. 6A is a cross-section lateral view of the liquid die 100 of an embodiment of the invention, and FIG. 6B is a cross-section top view of the die 100, highlighting a preferred embodiment that utilizes a plurality of liquid feed channels 17.

Figure 7:
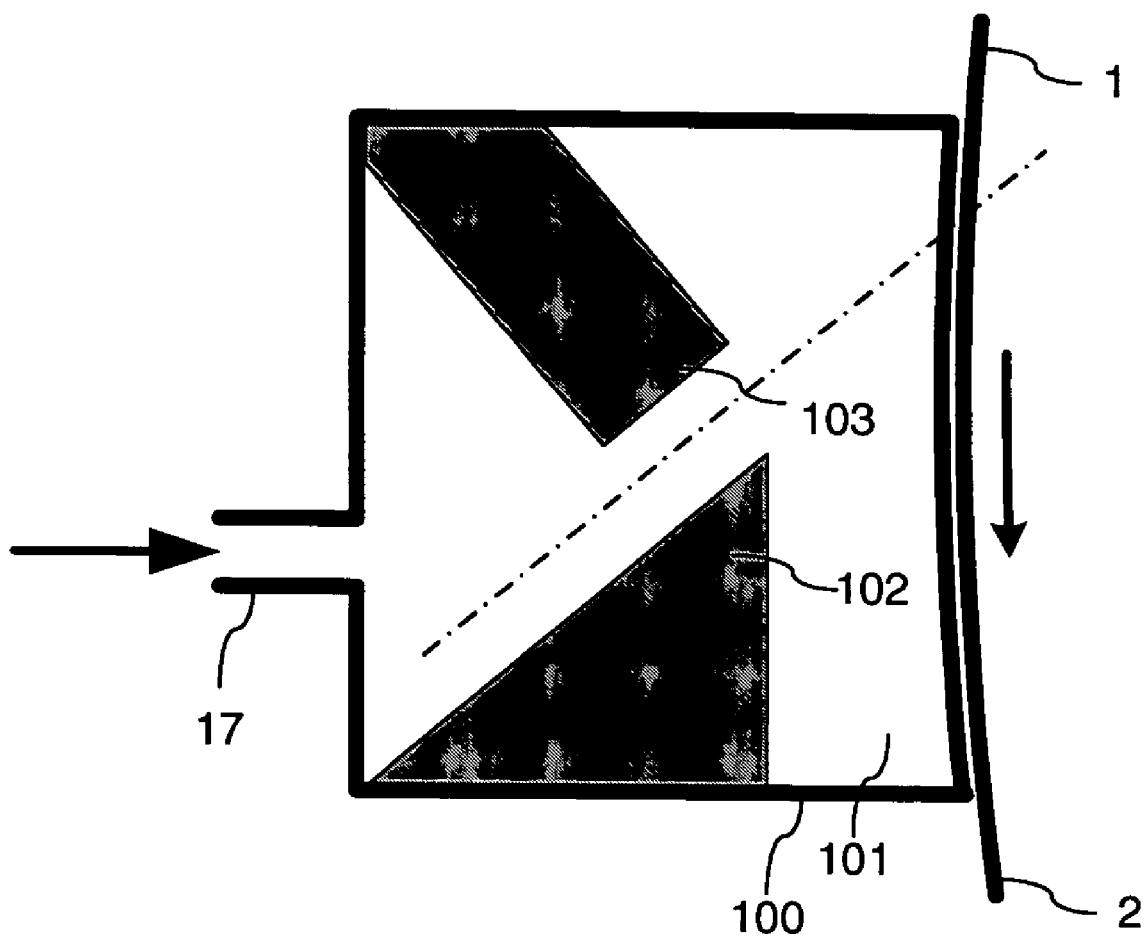
FIG. 7 depicts a detailed side view of a liquid die of the invention showing liquid profiling blocks.

FIG. 7 is a cross-section of a preferred embodiment of a liquid die 100 of the invention. Liquid enters the die through liquid feed channels 17 and impacts a first liquid profiling block 102 that directs a first liquid mass generally in the direction of the leading die wall. While not intending on being bound by any theory, the inventors believe that water fills the rear cavity, defined by the first and second profiling blocks 102, 103, together with the die wall that faces away from the screen. The filled rear cavity receives additional water and equalizes water conditions along the entire length of the rear cavity. A second water mass then passes between the parallel surfaces of the profiling blocks 102, 103, and into the front cavity 101 of the die propelled by the pressure in the rear cavity. It is believed that the second water mass has less velocity than the first water mass. The front cavity 101 is defined by the first and second profiling blocks 102, 103, together with the leading and trailing die walls, and the die opening.

The die is positioned such that the leading, trailing, and side walls are positioned in close proximity to the film passing by it, so that liquid will continue to enter the front cavity at a faster rate than it leaves it, thereby filling the front cavity. It is believed that as additional liquid mass enters the front cavity, pressure is built up and liquid mass begins to exert pressure on the passing film. Once pressure increases sufficiently, the film begins to aperture. Alternatively if it is not desired that the film aperture then liquid will be permitted to exit by controlling the distance between the die and the film, or by controlling liquid exit channels built into the trailing die wall. Pressure on the film is exerted over the entire width of the cavity 101, which causes the film forming process over the entire cavity 101 width. The inventors believe that pressure would be higher at the top portion of cavity 101 than the bottom portion (i.e., the leading die wall has a higher pressure). This would cause film to rupture at the top and continue deformation as the web passes over the bottom portion of the cavity 101.

Given the particular design of the fluid die of the invention, the inventors believe that fluid may enter the fluid die and exit without first filling the front cavity of the die. That is, the pressure exerted by the incoming fluid may be sufficient to force the fluid out of the die and aperture the film.

A person skilled in the art will recognize how to vary the die width to extend the length of time that liquid mass applies pressure onto film-called "dwell-time." As a result of the improved design, the forming capacity is no longer limited by the nozzle design, by the number of nozzles, or by the space available to add manifolds and liquid feed channels. Instead, forming capacity is controlled by the die design and the water supply. FIG. 8 depicts two pressure footprints from liquid die cavities 101 of equal length, with footprint A having a narrower width and footprint B having a wider width. The dark areas show areas of higher water pressure and the light areas show areas of less pressure. The arrows indicate direction of film movement. At equal line speeds, footprint A has a shorter dwell-time than footprint B, therefore it has less forming capacity.

Figure 9:
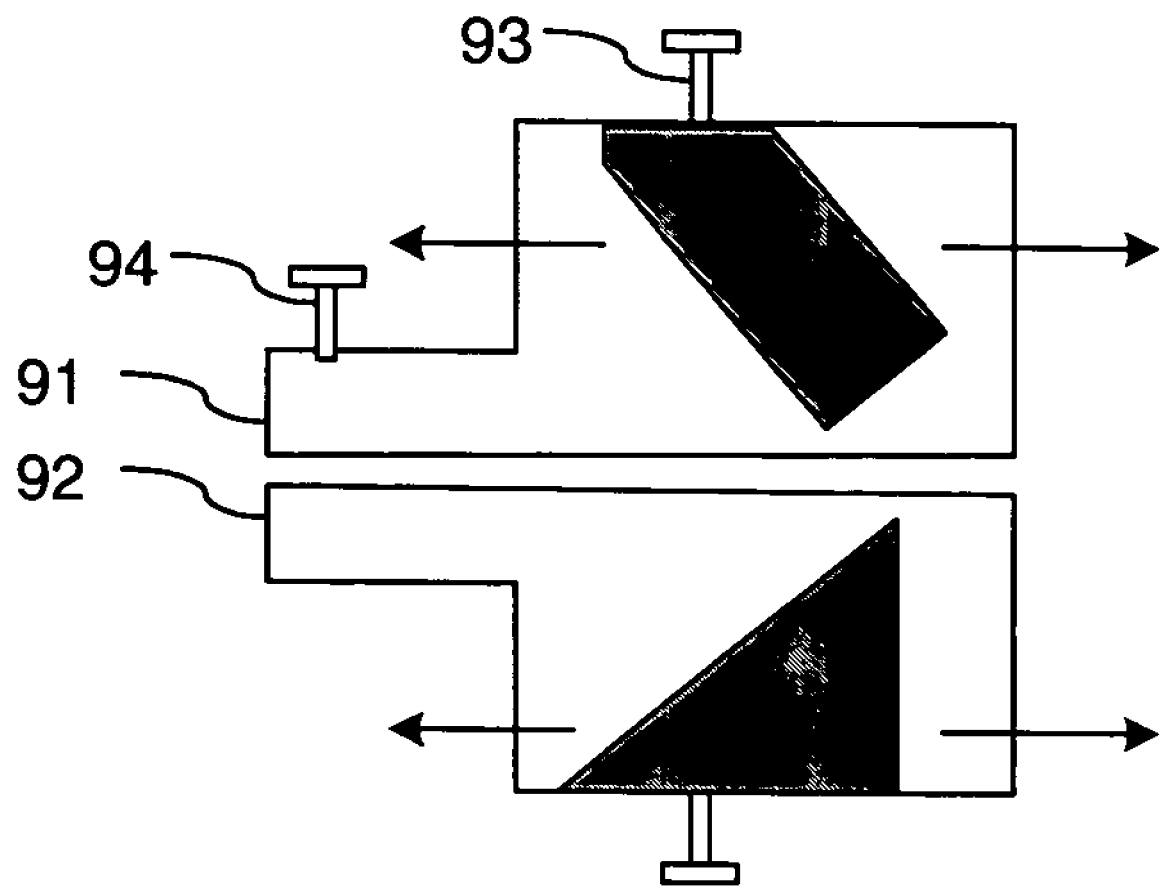
FIG. 9 illustrates the body of a liquid die of the invention constructed from two parts.

Adjustable profiling blocks preferably are employed as shown in FIG. 9 to make the die 100 even more practical. Profiling blocks as shown can be positioned nearer or further away from the film, and can be locked into position by block locking bolts 93. In addition, a liquid channel feed control bolt 94 is shown that can be used to throttle liquid flow through a liquid feed channel. As the die length increases, producing even flow though all the liquid flow channels becomes increasingly difficult to predict and manage, therefore the feed control bolts enable on-line adjustments to facilitate operation. The die shown in FIG. 9 is comprised of two parts, the upper die block 91 and the lower die block 92. Both die blocks are secured together to form a liquid die 100.

Figure 10:
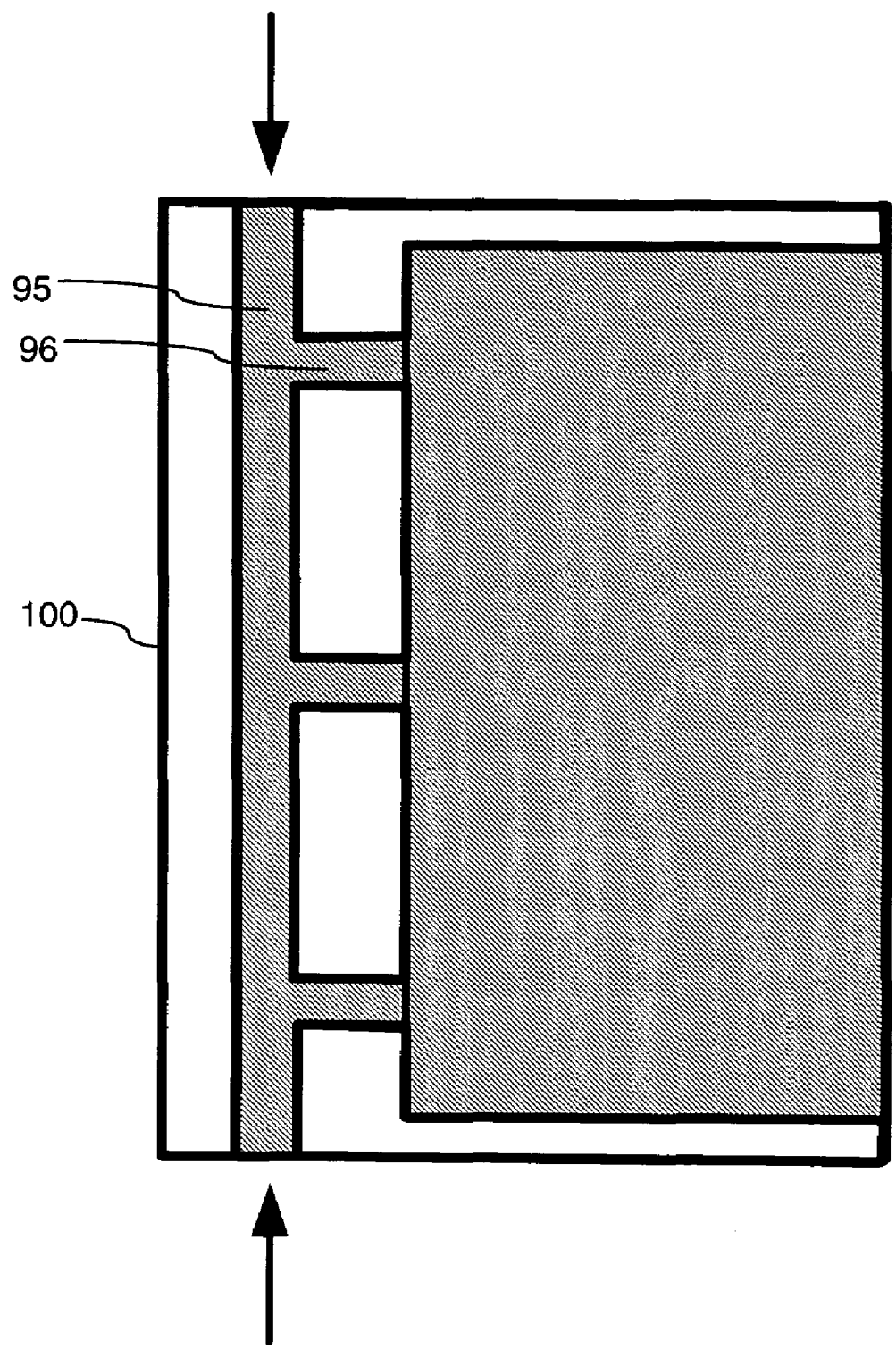
FIG. 10 illustrates one part of a two-part liquid die body incorporating liquid flow channels.

FIG. 10 illustrates a preferred integral liquid die 100 of the invention comprising built-in liquid feed channels 96 and a built-in manifold 95. The arrows indicate points of liquid supply. Although the manifold and liquid feed channels are shown to have constant width and to bend at right angles, a main advantage of an integral liquid die is that the channels can be made of continuously varying diameter or cross-section, and can easily be built at any number of bending radiuses. The flexibility of the integral liquid die enables design to minimize energy losses through the die, and facilitates thermal insulation.

Figure 11:
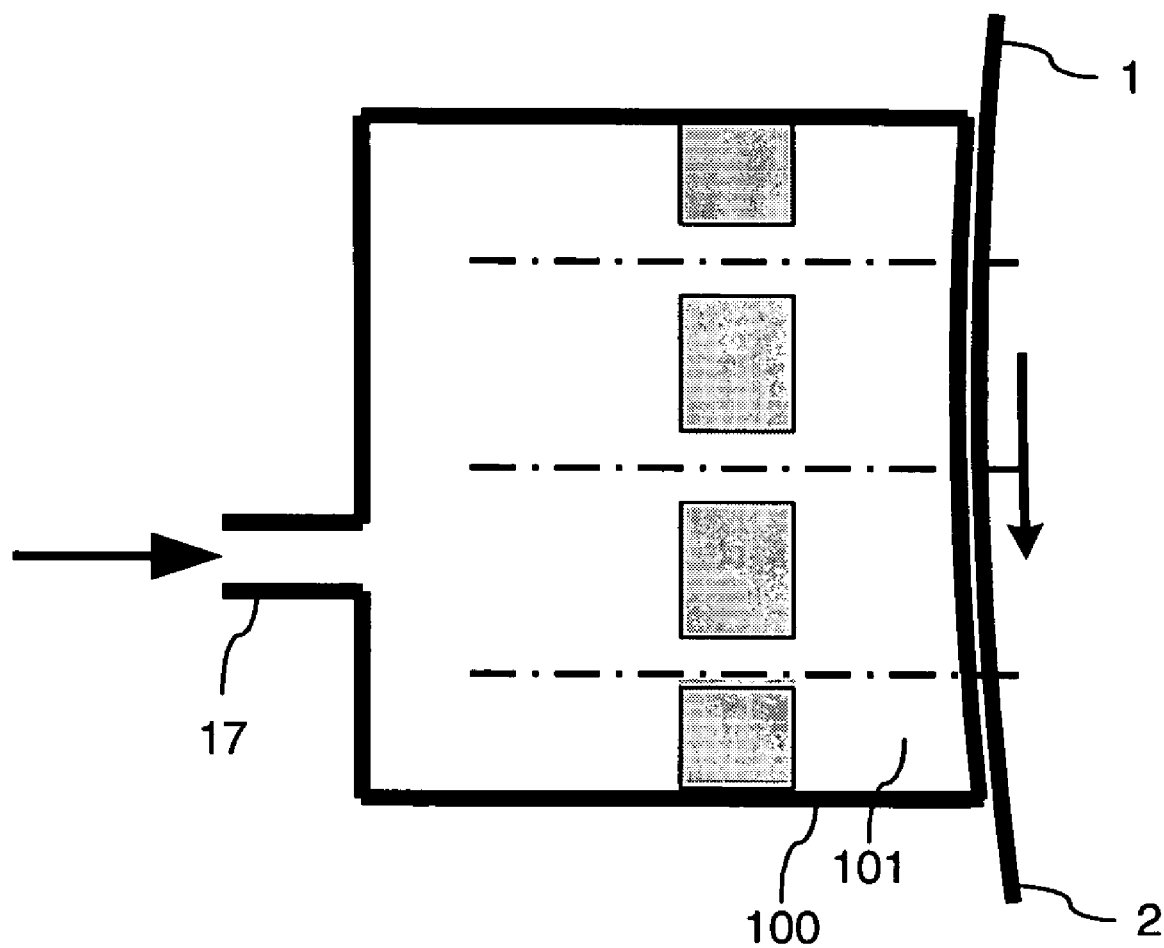
FIG. 11 illustrates a side view of a liquid die of an embodiment of the invention.
Figure 12:
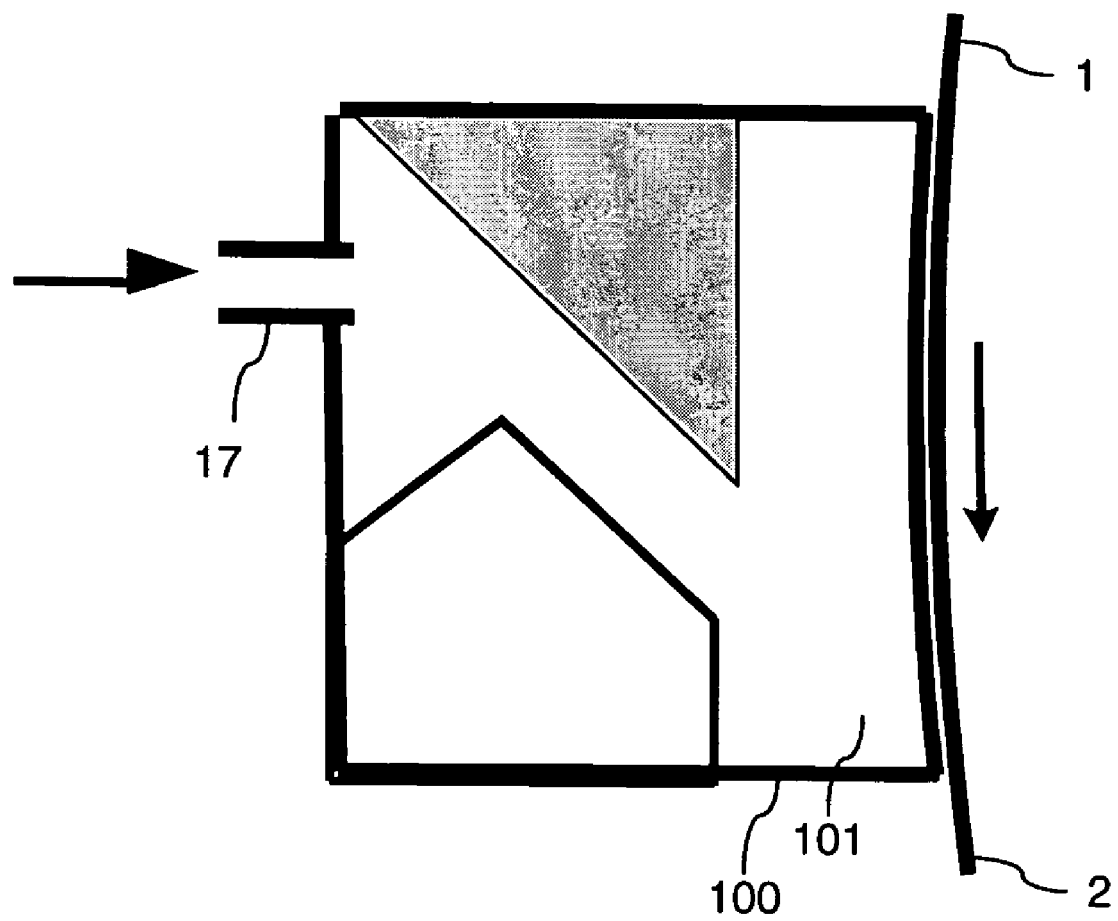
FIG. 12 illustrates a side view of a liquid die of another embodiment of the invention.
Figure 13:
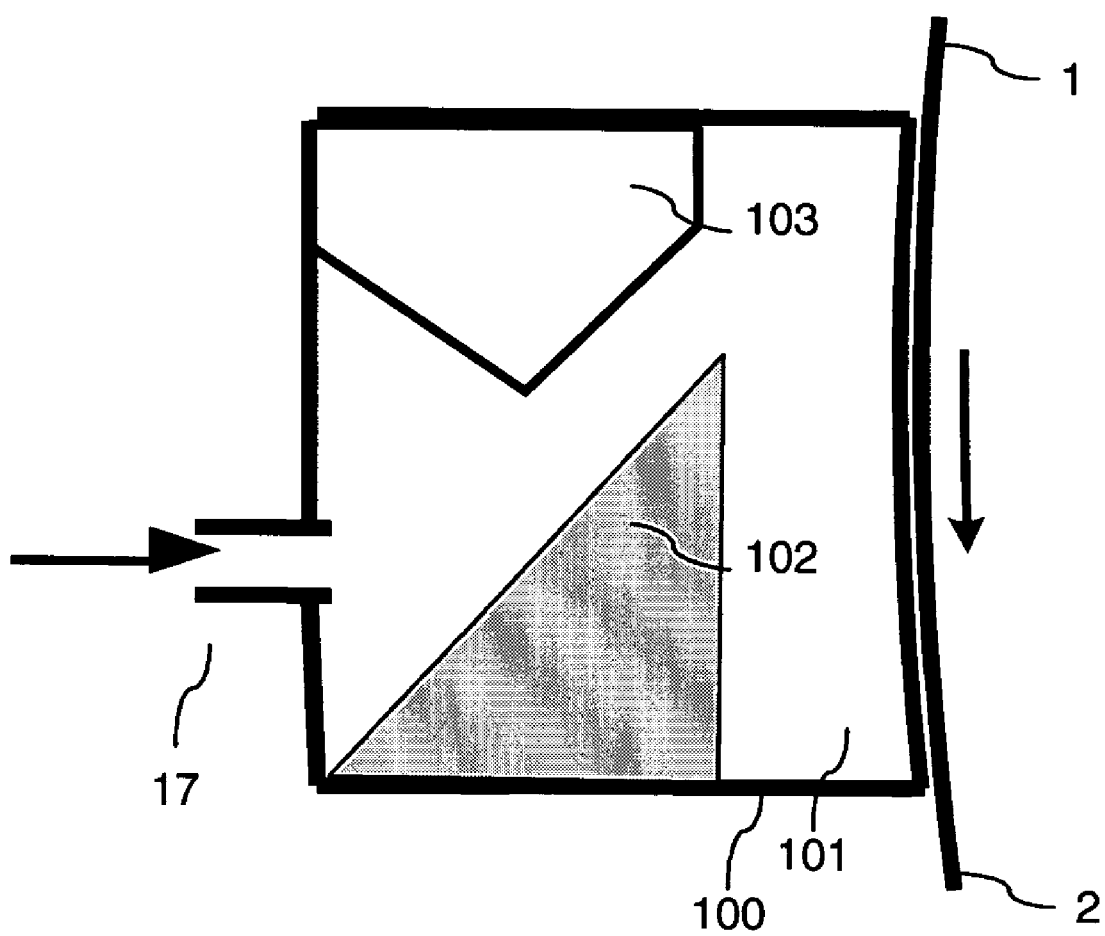
FIG. 13 illustrates a side view of a liquid die of another embodiment of the invention.

Other embodiments of the invention are illustrated in FIGS. 11, 12, and 13. FIG. 11 illustrates a fluid die 100 having relatively uniformly positioned profiling blocks. These profiling blocks provide relatively uniform pressure across the entire width of the cavity 101. FIG. 12 illustrates a fluid die 100 having profile blocks configured to provide higher pressure at the lower portion of cavity 101. In FIG. 12, the upper profiling block has a triangular cross-section, whereas the cross-section of the lower profiling block has more of a pentagon shape. FIG. 13 illustrates a fluid die 100 that is essentially the reverse of FIG. 12. In FIG. 13, the lower profiling block 102 is triangular shaped directing fluid flow to the upper portion of cavity 101, whereas the upper profiling block 103 has more of a pentagon shape. The embodiment depicted in FIG. 13 provides higher pressure at the upper portion of cavity 101, or at the leading wall of fluid die 100.

Usually the film of the invention is made from a polymer, such as polyethylene, e.g., low density polyethylene (LDPE), linear low density polyethylene (LLDPE) or a mixture of LDPE and LLDPE, polypropylene, and combinations thereof. In one embodiment the film is made from a mixture of at least about 10% by weight, or about 10% to about 50% by weight of medium density polyethylene (MDPE) and the remainder LDPE, LLDPE or a blend of LDPE and LLDPE. The film may also be made from a mixture of at least 10% by weight, or about 10% to about 50% by weight of high density polyethylene (HDPE) and the remainder LDPE, LLDPE or a blend of LDPE and LLDPE. Each of the material formulations can include additional materials, usually in small percentages relative to the polymer, for example processing aids, colorants (e.g. whiteners), surfactants, and other known additives and adjuvants.

EXAMPLE 1

A 0.001 inch thick flat polyethylene film was formed at a line speed of 150 feet per minute using the liquid die shown in FIG. 7. The liquid used was water, at 1750 Fahrenheit and 130 psi. The die length was 11.5 inches wide. The screen used had a hexagonal pattern of circular perforations made by metal punching, the screen having the following dimensions: 0.062 in. diameter holes; 0.036 in. thick; 60 degree array and 41% open area. The die was capable of suitable making a formed film that essentially mirrored the shape of the screen.

The invention has been described with reference to particularly preferred embodiments and examples. Those skilled in the art will appreciate that various modifications may be made to the invention without departing from the spirit and scope thereof.

We claim:

1. A fluid die useful in making soft film comprising:
   a fluid feed manifold;
   at least one fluid feed channel in fluid communication with the fluid feed manifold;
   at least two profiling blocks positioned within the fluid feed channel;
   a housing comprising a leading wall, a trailing wall, and two side walls, the housing encompassing at least the fluid feed channel and the profiling blocks, wherein the profiling blocks are configured to consistently provide a higher pressure at the leading wall while water is flowing through the fluid feed channel.

2. The fluid die as claimed in claim 1, wherein the die comprises at least two profiling blocks.

3. The fluid die as claimed in claim 2, wherein the profiling blocks are adjustable.

4. The fluid die as claimed in claim 1, wherein the die comprises at least two fluid feed channels.

5. The fluid die as claimed in claim 4, wherein the die comprises at least four fluid feed channels.

6. The fluid die as claimed in claim 1, wherein the fluid feed channel is adjustable to adjust the fluid flow through the feed channel.

7. The fluid die as claimed in claim 1, wherein two profiling blocks are used, each profiling block have a substantially different shape.

8. The fluid die as claimed in claim 7, wherein at least one of the profiling blocks is triangular, and at least one of the profiling blocks is a pentagon.

9. A method of making a film comprising: supplying a precursor film; pressing the precursor film against a surface of a screen provided with indentations; passing successive portions of the precursor film under the fluid die of claim 1; applying liquid pressure to the film to form protuberances; and removing protubered film from the screen.

10. The method as claimed in claim 9, wherein the precursor film is comprised at least of polyethylene.

11. The method as claimed in claim 9, wherein the protuberances at least partially comprise apertured protuberances.

12. The method as claimed in claim 9, wherein the liquid pressure applied by the fluid die is sufficient to aperture the film.

13. The method as claimed in claim 9, wherein the fluid die comprises at least two profiling blocks.

14. The method as claimed in claim 13, wherein the profiling blocks are adjustable.

15. The method as claimed in claim 9, wherein the fluid die comprises at least two fluid feed channels.

16. The method as claimed in claim 15, wherein the die comprises at least four fluid feed channels.

17. The method as claimed in claim 9, wherein the fluid pressure at the leading wall of the fluid die is greater than the fluid pressure at the trailing wall.

18. The method as claimed in claim 9, wherein the fluid pressure at the leading wall of the fluid die is substantially the same as the fluid pressure at the trailing wall.

19. The method as claimed in claim 9, wherein the fluid feed channel of the fluid die is adjustable to adjust the fluid flow through the feed channel.

20. The method as claimed in claim 9, wherein two profiling blocks are used, each profiling block have a substantially different shape.

21. The method as claimed in claim 20, wherein at least one of the profiling blocks is triangular, and at least one of the profiling blocks is a pentagon.

22. The method as claimed in claim 9, wherein two profiling blocks are used, each profiling block have substantially the same shape.

23. A fluid die, comprising:
a fluid feed manifold;
at least one fluid feed channel in fluid communication with the fluid feed manifold;
two profiling blocks positioned within the fluid feed channel, wherein each profiling block has a substantially different shape; and
a housing comprising a leading wall, a trailing wall, and two side walls, the housing encompassing at least the fluid feed channel and the profiling block.

24. The fluid die as claimed in claim 23, wherein the profiling blocks are adjustable.

25. The fluid die as claimed in claim 23, wherein the die comprises at least two fluid feed channels.

26. The fluid die as claimed in claim 25, wherein the die comprises at least four fluid feed channels.

27. The fluid die as claimed in claim 23, wherein the fluid feed channel is adjustable to adjust the fluid flow through the feed channel.

28. A fluid die useful in making soft film comprising:
a fluid feed manifold;
at least one fluid feed channel in fluid communication with the fluid feed manifold;
at least one profiling block positioned within the fluid feed channel, wherein at least one of the profiling blocks is triangular and at least one of the profiling blocks is a pentagon; and
a housing comprising a leading wall, a trailing wall, and two side walls, the housing encompassing at least the fluid feed channel and the profiling block.

29. The fluid die as claimed in claim 28, wherein the profiling blocks are adjustable.

30. The fluid die as claimed in claim 28, wherein the die comprises at least two fluid feed channels.

31. The fluid die as claimed in claim 30, wherein the die comprises at least four fluid feed channels.

32. The fluid die as claimed in claim 28, wherein the fluid feed channel is adjustable to adjust the fluid flow through the feed channel.

* * * * *